July 27, 1965 K. RITTER 3,196,696
TRACTOR TRANSMISSIONS
Filed Aug. 22, 1961 2 Sheets-Sheet 1

FIG. I

INVENTOR.
Kaspar Ritter
BY Michael S. Striker
Attorney

July 27, 1965  K. RITTER  3,196,696
TRACTOR TRANSMISSIONS
Filed Aug. 22, 1961  2 Sheets-Sheet 2
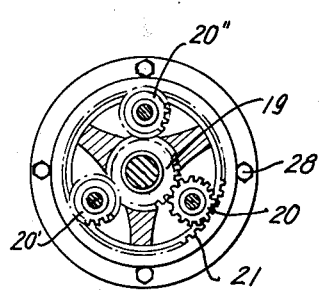
FIG. 2
FIG. 3
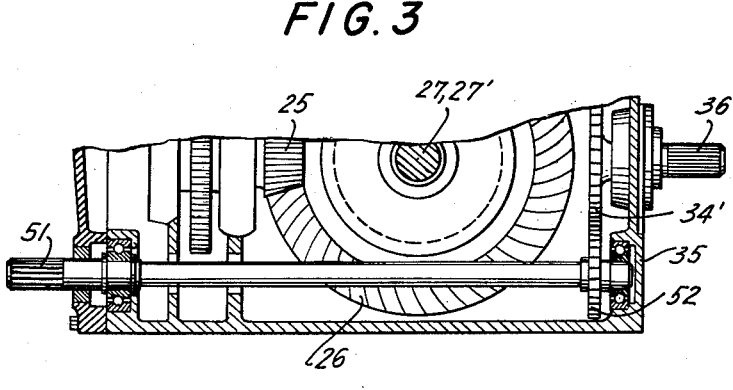
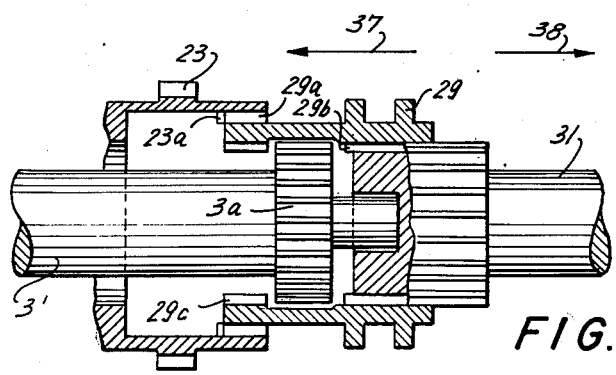
FIG. 4
INVENTOR.
Kaspar Ritter
BY Michael S. Striker
Attorney

United States Patent Office 3,196,696
Patented July 27, 1965

3,196,696
TRACTOR TRANSMISSIONS
Kaspar Ritter, Kirchheim, Teck, Germany, assignor to Allgaier-Werke G.m.b.H., Uhingen, Wurttemberg, Germany
Filed Aug. 22, 1961, Ser. No. 133,255
Claims priority, application Germany, Aug. 27, 1960, A 35,433
5 Claims. (Cl. 74—15.63)

The present invention relates to vehicles such as tractors and the like.

In vehicles of this type it is conventional to provide between the engine of the vehicle and the axle which propels the vehicle a variable-speed transmission which may take the form of a hydraulic torque converter including an elongated member connected to said engine-driven element for rotation therewith and extending through said variable speed transmission, and means for selectively connecting said power take-off shaft to said elongated member or to said step-down transmission or for connecting said step-down transmission to said elongated member. Such vehicles conventionally include at least one power take-off shaft through which different accessories may be driven, and the structure may include a transmission for optionally connecting the power take-off shaft to the variable-speed transmission to be driven thereby or to an engine-driven element to be driven by the engine-driven element. Thus, when such a power take-off shaft is driven from the variable-speed transmission, the speed of the power take-off shaft will vary with the speed of travel of the vehicle. On the other hand when the power take-off shaft is connected directly to the engine of the vehicle, the power take-off shaft will be driven at a speed which is independent of the speed of travel of the vehicle. In order to connect the power take-off shaft to the engine it is necessary, of course, to provide a transmission which is capable of by-passing the variable-speed transmission, and as a result the housing in which the variable-speed transmission is located must be made large enough to include the structure for transmitting a drive directly from the engine to the power take-off shaft. As a result this housing is relatively large and certainly much larger than is required by the variable-speed transmission itself. Thus, with conventional structures of this type the space in the immediate vicinity of the tractor is occupied to an undesirably large degree by this housing which must accommodate not only the variable-speed transmission but also the transmission from the engine to the power take-off shaft. This conventional construction presents a serious problem since it is desired very often to operate accessories which frequently must be located directly ahead of the rear wheels of the tractor between the rear and front wheels thereof. Because of the size of the housing referred to above, the space beneath this housing and between the front and rear wheels of the tractor is extremely limited and therefore it is not always possible to locate between the front and rear wheels of the tractor accessories which could advantageously be located in this position if the housing were smaller.

It is accordingly a primary object of the present invention to provide a structure of the above type which on the one hand is capable of transmitting a drive to a power take-off shaft optionally from the variable-speed transmission or from the engine and which on the other hand includes over the space between the front and rear wheels of the tractor a housing much smaller than the conventional housing at this location and enabling any desired accessories to be located in the space between the front and rear wheels of the tractor.

Another object of the present invention is to provide a structure of the above type which is extremely compact so as to require a smaller housing as referred to above and which at the same time is capable of operating a unit such as a variable-speed transmission with an efficiency greater than that with which a conventional unit of this type can be operated.

A further object of the present invention is to provide for a structure of the above type an arrangement which enables a large number of elements such as the transmission from the engine to a power take-off shaft, the clutch for placing such a transmission either in a position connecting the engine to the power take-off shaft or in a position connecting the variable-speed transmission to the power take-off shaft, and the other elements to be positioned concentrically with respect to the variable-speed transmission so as to provide an extremely compact assembly on high efficiency.

An additional object of the present invention is to provide an assembly according to which a make-up pump cooperates with the hydraulic torque converter in such a way that the structure required for sealing the hydraulic circuit and the efficiency of the hydraulic assembly is greatly improved as compared to conventional assemblies.

It is furthermore an object of the present invention to provide a structure of the above type capable of operating a plurality of power take-off shafts which are accessible at different parts of the vehicle and which will have different speeds of rotation so as to be adapted for use with different units.

Still another object of the present invention is to provide in a structure of the above type a subassembly including a torque converter capable of being quickly and easily separated from and joined to the remainder of the structure.

The objects of the present inventon also include the provision of a structure capable of accomplishing all of the above objects and at the same time composed of simple rugged elements which are very reliable in operation.

With the above objects in view the invention includes, in a vehicle such as a tractor or the like, a variable-speed transmission such as a hydraulic torque converter, a rotary power take-off shaft, and an engine-driven element. A transmission means cooperates with the torque converter, the power take-off shaft, and the engine-driven element for optionally transmitting a drive from the torque converter to the power take-off shaft or from the engine-driven element to the power take-off shaft, and in accordance with the present invention this transmission means includes an elongated member extending, preferably centrally, through the torque converter.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

FIG. 2 is a transverse section of the structure of FIG. 1 taken along the line II—II of FIG. 1 in the direction of the arrows;

FIG. 3 is a fragmentary longitudinal section of another embodiment of the structure of FIG. 1; and FIG. 4 shows at a greater scale than FIG. 1 a clutch assembly of FIG. 1.

Figure 1:
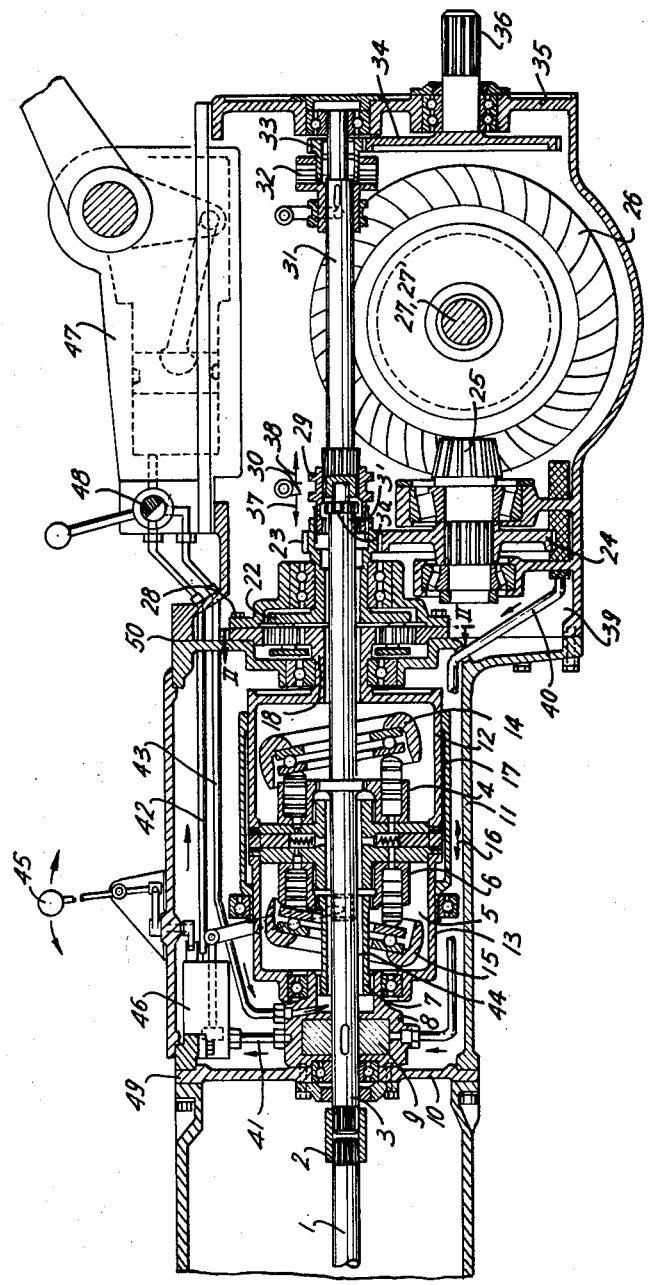
FIG. 1 shows a structure according to the present invention in a longitudinal section.

The tractor drive shown in the drawing derives its energy from an unillustrated internal combustion engine which includes a crankshaft, and at the left portion of FIG. 1 is shown a shaft 1 which forms an extension of and is fixed to this crankshaft, so that the shaft 1 rotates about its own axis at the same speed as the crankshaft of the unillustrated combustion engine. A coupling 2 couples the shaft 1 to a coaxial shaft 3 which is supported for rotation about its axis by the bearings shown in FIG. 1, so that this shaft 3 also rotates about its own axis at the same speed as the crankshaft of the internal combustion engine. The shaft 3 serves to transmit the drive from the internal combustion engine to a variable-speed transmission in the form of a hydraulic torque converter made up of a pump and fluid motor both of which are parallel-piston type variable-displacement multipiston structures of identical design. The shaft 3 is permanently connected with the piston barrel 4 of the pump of the torque converter 5 so that this piston barrel 4 rotates with the shafts 1 and 3. The piston barrel 6 of the fluid motor of the torque converter is fixedly carried by a stationary hollow shaft 7 which is in turn fixedly carried by the housing 8 of a stationary make-up pump 9 which is fixedly carried by stationary housing 10, 11, so that in this way the piston barrel 6 remains stationary. The output of the hydraulic torque converter 5 serves in a well known manner to drive the elongated multipart shaft or housing 12, 13 from which the output of the variable-speed transmission 5 is taken. The hollow output shaft 12, 13 of the variable-speed transmission 5 is surrounded by an annular adjusting element 17 which slidably engages the exterior of the hollow shaft 12, 13 and is axially shiftable therealong in opposite directions, as shown by the arrow 16, for the purpose of adjusting, in a well known manner, the inclination of the wobble rings 14 and 15 so as to provide a steplessly variable transmission ratio ranging all the way from the greatest forward driving speed to the greatest rearward driving speed. The shaft portion 12 has an elongated right end section 18 of reduced diameter extending through a suitable bearing at the right end of the housing 11, as viewed in FIG. 1, to the exterior of the housing 11 where the hollow shaft portion 18 terminates in the inner sun gear 19 of a planetary gearing which is shown most clearly in FIG. 2. It will be noted that the elongated shaft portion 3′ which extends through the variable-speed transmission beyond the connection of the shaft 3 to the piston barrel 4 also extends centrally through the sun gear 19 so that the planetary gearing shown in FIG. 2 coaxially surrounds the shaft 3′ which is fixedly coaxially to and forms an extension of the shaft 3. The planetary gearing includes the planetary gears 20, 20′ and 20″ as well as the outer sun gear 21. Thus, the gear 19 is driven directly by and rotates with the hollow output shaft 12, 13 of the variable-speed transmission 5. The planetary gears of the differential shown in FIG. 2 are carried by a rotary spider 22 which has a central hollow tubular portion through which the shaft 3′ extends freely, and this hollow tubular portion of the spider 22 has adjacent its right end an outer gear 23 which thus turns with the spider 22 and which meshes with a gear 24 of a larger diameter than the gear 23 and supported for rotation in the manner shown in FIG. 1. A multistage step-down transmission transmits the drive from the variable-speed transmission 5 to the rear axle means 27, 27′ of the tractor, the axles 27, 27′ being connected in an unillustrated well known manner to the rear wheels of the tractor, and the first stage of the step-down transmission is formed by the planetary gearing shown in FIG. 2, while a second stage of the step-down transmission is formed by the pinion 23 and the gear 24, and the third stage is formed by the bevel gear 25 and the bevel gear 26 which meshes with the bevel gear 25 and which surrounds the axle means 27, 27′ in the manner shown in FIG. 1. The bevel gear 26 drives the axle means 27, 27′ in a well known manner through an unillustrated differential assembly. Of course the bevel gear 25 is fixed coaxially to the gear 24 so as to rotate therewith.

The outer sun gear 21 of the planetary gearing 19–21 may be fixed to the stationary housing 11 by way of bolts 28, as shown in FIGS. 1 and 2, or a pair of brakes may be provided for optionally fixing the sun gear 21 either to the housing 11 or to the spider 22 for rotation with the latter. In this latter case the planetary gearing provides two different step-down transmission ratios, for example one for travel of the tractor on highways and the other for travel of the tractor during working operations.

Also coaxially arranged with respect to the shaft 3′ is a 3-position clutch 29 shown most clearly in FIG. 4 and capable of being axially shifted through a conventional shifting fork 30, this clutch 29 cooperating with the gear 23 which rotates with the spider 22 in the manner described below. The clutch 29 is shown in FIGS. 1 and 4 in an intermediate position where the exterior teeth 29a of the clutch 29 mesh with the interior teeth 23a of the rotary gar member or pinion 23 so that the clutch member 29 in this position is compelled to rotate with the pinion 23. Adjacent its right end, as viewed in FIGS. 1 and 4, the clutch 29 has inner teeth meshing with teeth at the left end of the shaft 31 shown in FIG. 1, so that in this way in the intermediate position of the clutch 29 shown in FIGS. 1 and 4 the clutch 29 connects the pinion 23 to the rotary shaft 31 which is coaxial with but freely turnable with respect to the shaft 3′. This shaft 31 cooperates through a friction clutch assembly 32 with a pinion 33 which in turn meshes with a gear 34 fixed coaxially to a power take-off shaft 36 which has an outer end extending beyond the wall 35 shown in FIG. 1 so that any desired unit may be connected to the power take-off shaft 36 to be driven thereby. The friction clutch 32 can be engaged or disengaged by the operator through an unillustrated linkage. Inasmuch as the power take-off shaft 36 will, in the illustrated intermediate position of the clutch 29, be driven from the variable-speed transmission 5 which drives the axle means 27, 27′, the power take-off shaft 36 will at this time be driven at a speed proportional to and depending upon the speed of travel of the vehicle.

The shifting fork 30 may be turned by the operator, through an unillustrated linkage, so as to shift the clutch 29 forwardly in the direction of the arrow 37, and because of the relatively short length of the inner teeth of the gear 23 and the outer teeth at the front end of the clutch 29, these latter teeth of the clutch 29 move forwardly beyond the inner teeth of the gear 23 so that there no longer is a driving connection between the clutch 29 and the gear 23. In other words the teeth 29a move forwardly beyond the teeth 23a. On the other hand, the inner teeth 29b which mesh with the teeth at the left end of the shaft 31 are relatively long and move into mesh with the teeth 3a at the right end of the shaft 3′ while remaining in mesh with the teeth of the shaft 31, so that in the forward position of the clutch 29 the shaft 31 is connected through the elongated member or shaft 3′ with the shaft 3 which is driven directly from the engine, and thus in this forward position of the clutch 29 the power take-off shaft 36 will be driven at a speed determined by the engine speed and having no relation to the speed of travel of the vehicle. The friction clutch 32 can be actuated so that if desired the power take-off shaft 36 may have the drive transmitted thereto or cut off therefrom even when the shaft 36 is under load.

The operator can also actuate the shifting fork 30 so as to move the clutch 29 rearwardly from its intermediate position in the direction of the arrow 38 shown in FIG. 1, and in this position not only will the teeth 23a and 29a engage each other, but in addition the inner teeth 29c at the front end of the clutch 29 will mesh with the teeth 3a so that the transmission shaft 3′ in this position of the clutch 29 is connected directly to the output of the variable-speed transmission 5. This third position of the clutch 29 can therefore be used to drive the engine from the axle means 27, 27' in order, for example, to start the engine during pulling of the vehicle by another vehicle. Also, this position of the clutch 29 may be used in an emergency in order to drive the vehicle directly from the engine through the mechanical step-down transmission in the event that the hydraulic torque converter 5 should become inoperative.

The make-up pump 9, whose housing 8 has been referred to above, may have any known construction and is driven directly from the shaft 3. This pump sucks fluid from the sump 39 through the conduit 40 which communicates through a suitable filter with the sump 39, and this fluid, oil for example, is delivered under pressure by the pump 9 along the conduit means 41, 42, 43 in the direction indicated by the arrows in FIG. 1. From this conduit means 41–43 the fluid will flow along an elongated annular passage 44 formed between the shaft 3 and the stationary hollow shaft 7 at a relatively small pressure continuously into the hydraulic circuit of the torque converter 5 in order to compensate for leakage losses. A pair of auxiliary devices communicate with and are connected into the conduit means 41–43 and are operated at a much higher pressure, and one of these auxiliary devices is a servo means 46 capable of being manually operated through the linkage 45 and operatively connected with the adjusting element 17 to shift the latter axially and thus adjust the inclination of the wobble rings 14 and 15. The second device is a hydraulic jack or lifting device 47 of conventional construction controlled through the valve 48, and these devices 46 and 47 are connected in series, as shown in FIG. 1.

Thus, it will be seen that with the structure of the invention the power take-off shaft 36 is controlled through a transmission means 3', 29, 31, 32, 33, 34 which, through the clutch 29, can optionally connect the power take-off shaft 36 to the torque converter 5 to be driven thereby or to the engine-driven element 3 to be driven thereby, and it will be noted that with the structure of the invention the elongated member 3' of this transmission extends centrally through the torque converter 5. Thus, when the power take-off shaft 36 is driven directly from the engine, the torque converter 5 is by-passed by the shaft structure 3, 3' which extends centrally through and is surrounded by the torque converter, and therefore the housing in which the torque converter is located need not be made undesirably large for the purpose of accommodating structure which bypasses the torque converter. In fact, as is clear from FIG. 1, the bottom wall 11 of the housing 10, 11 in which the torque converter is located is situated extremely close to the torque converter 5 so that a maximum amount of space is available between the front and rear wheels of the vehicle beneath the housing 10, 11. It will be noted from FIG. 1 that the torque converter 5 together with the makeup pump 8, 9 and the servo means 46 as well as the housing 10, 11 form a separate subassembly easily disassembled from and reassembled with the remainder of the structure. Thus, the engine housing shown at the left of FIG. 1 terminates in a flange 49 to which the housing 10, 11 can be easily connected and from which it can be easily disconnected, and the rear axle housing terminates at its left end in a flange 50 to which the intermediate housing 10, 11 can also be easily connected and from which it can be easily disconnected, so that for repair or replacement purposes this entire sub-assembly can be easily disassembled from and reassembled with the structure shown in FIG. 1.

As is shown in FIG. 3, it is possible to place in mesh with the gear 34', which may be of a smaller diameter than the gear 34, an additional gear 52 fixed coaxially to a second power take-off shaft 51 which extends forwardly to the space beneath the housing 10, 11 in the manner shown in FIG. 3, and the gear 34' may have twice the diameter of the gear 52 so that the shaft 51 rotates at twice the speed of the shaft 36. This power take-off shaft 51 may be used to drive a mower, reaper, or the like, and since the shaft 51 is driven through the transmission 33, 34', 52, it is possible to use the friction clutch 32 for connecting the drive to and disconnecting the drive from the accessories driven by the shaft 51 even when the accessory is under load. It will be noted that the friction clutch 32 itself is coaxial with the clutch 29, the planetary gearing 19–21, and the torque converter 5 so that an extremely compact and highly efficient assembly is provided.

Because the make-up pump 8, 9 supplies oil to the torque converter through the passage 44, defined in part by the outer stationary hollow shaft 7, the sealing of the torque converter can be extremely simple and inexpensive and at the same time the reliability of operation of the entire unit is enhanced.

Because of the step-down transmission ratio provided by the planetary gearing 19–21, the transmission ratio of the hydraulic torque converter itself can be made correspondingly smaller and thus its efficiency can be increased.

Of course, a considerable advantage is obtained by using the make-up pump 8, 9 not only in connection with the torque converter but also to operate the units 46 and 47.

It will be understood that each of the elements described above, or two or more together, may also find a useful application in other types of vehicles differing from the types described above.

While the invention has been illustrated and described as embodied in tractors, it is not intended to be limited to the details shown, since various modifications and structural changes may be made without departing in any way from the spirit of the present invention.

Without further analysis, the foregoing will so fully reveal the jist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In a vehicle such as a tractor or the like, in combination, a hydraulic steplessly variable speed transmission; axle means which rotates during travel of the vehicle; a step-down transmission operatively connected to and transmitting a drive from said steplessly variable speed transmission to said axle means, said step-down transmission including a plurality of stages from said steplessly variable speed transmission to said axle means and the first of said stages being in the form of planetary gearing; a rotary power take-off shaft; including an elongated member connected to said engine-driven element for rotation therewith and extending through said variable speed transmission, and means for selectively connecting said power take-off shaft to said elongated member or to said step-down transmission or for connecting said step-down transmission to said elongated member.

2. In a vehicle such as a tractor or the like, in combination, a hydraulic steplessly variable speed transmission; axle means which rotates during propelling of the vehicle; a step-down transmission operatively connected to and transmitting a drive from said steplessly variable speed transmission to said axle means and including a plurality of stages from said steplessly variable speed transmission to said axle means, and the first of said stages being in the form of planetary gearing; a rotary power take-off shaft; including an elongated member connected to said engine driven element for rotation therewith and extending centrally through said variable speed transmission and said planetary gearing, and means for selectively connecting said power take-off shaft to said elongated member or to said step-down transmission or for connecting said step-down transmission to said elongated member.

3. In a vehicle such as a tractor or the like, in combination, a hydraulic steplessly variable speed transmission including a parallel-piston variable-displacement multipiston pump and a fluid motor of the same design as said pump, said pump and motor each including a piston barrel; an engine-driven rotary shaft extending through said pump and motor; a make-up pump coaxially with and driven by said engine driven shaft for supplying the steplessly variable speed transmission with fluid to replace leakage losses and the like; a hollow shaft surrounding said engine driven shaft with clearance to define an elongated annular passage therewith, said hollow shaft being stationary and being fixed to said make-up pump and said hollow shaft being fixed to said piston barrel of said fluid motor for maintaining said piston barrel stationary and for supporting said latter piston barrel, said make-up pump communicating with the interior of the steplessly variable speed transmission through said annular passage formed between said engine-driven shaft and said hollow shaft; a rotary power take-off shaft; and transmission means operatively connected to said torque converter, said rotary power take-off shaft, and said engine-driven shaft for optionally transmitting a drive from said steplessly variable speed transmission to said rotary power take-off shaft or from said engine-driven shaft to said power take-off shaft, said transmission means including an elongated member fixed to and forming an extension of said engine-driven shaft.

4. In a vehicle such as a tractor or the like, in combination, rear axle means which participates during rotation in the propelling of the vehicle; a rear axle housing in which said rear axle means is at least partly located; an engine housing located forwardly of and spaced from said rear axle housing; a steplessly variable speed transmission operatively connected to said rear axle means for driving the same; an engine-driven element; a rotary power take-off shaft; transmission means operatively connected with said steplessly variable speed transmission, said engine-driven element, and said power take-off shaft for optionally transmitting a drive from said steplessly variable speed transmission to said power take-off shaft or from said engine-driven element to said power take-off shaft, said transmission means including an elongated member extending through said steplessly variable speed transmission; an intermediate housing interposed between and connected to said engine housing and said rear axle housing, said intermediate housing having said steplessly variable speed transmission located in the interior thereof and having a bottom wall located closely adjacent to said steplessly variable speed transmission; make-up pump means cooperating with said steplessly variable speed transmission for supplying thereto fluid under pressure to replace leakage losses and the like; and servo means cooperating with said steplessly variable speed transmission for adjusting the same, said make-up pump means and said servo means also being located in said intermediate housing and said intermediate housing closely surrounding the space occupied by said steplessly variable speed transmission, make-up pump means, and servo means.

5. In a vehicle such as a tractor or the like, in combination, an engine driven element; a hydraulic, steplessly variable-speed transmission; axle means which rotate during travel of said vehicle; a step-down transmission operatively connected to and transmitting a drive from said variable speed transmission to said axle means, said step-down transmission including a plurality of stages from said variable speed transmission to said axle means and the first of said stages being in the form of planetary gearing; a rotary power take-off shaft; and transmission means for optionally transmitting a drive from said variable speed transmission to said power take-off shaft or from said engine driven element to said power take-off shaft or from said engine driven element to said step-down transmission, said transmission means including an elongated member connected at one end to said engine driven element for rotation therewith and extending from said one end centrally through said variable speed transmission and said planetary gearing, and a three position clutch concentrically arranged about the other end of said elongated member and connecting in a first position said power take-off shaft to said other end of said elongated member, in a second position said first stage of said step-down transmission means to said power-take-off shaft, and in a third position said step-down transmission to said other end of said elongated member.

References Cited by the Examiner

UNITED STATES PATENTS

| 2,699,689 | 1/55 | Ahlen. | |
| 2,788,636 | 4/57 | Badalini | 60—53 |
| 2,838,940 | 6/58 | Swenson et al. | 74—15.2 |
| 2,854,820 | 10/58 | Bouquet | 60—53 |
| 2,869,397 | 1/59 | Weaving et al. | 74—687 |
| 2,945,382 | 7/60 | Ritter et al. | 74—15.8 |
| 2,975,656 | 3/61 | Haverlender | 74—15.63 XR |

FOREIGN PATENTS

| 792,083 | 3/58 | Great Britain. |
| 827,129 | 2/60 | Great Britain. |

BROUGHTON G. DURHAM, *Primary Examiner.*